(12) United States Patent
Van Phan et al.

(10) Patent No.: US 9,629,044 B2
(45) Date of Patent: Apr. 18, 2017

(54) APPARATUS AND METHOD FOR COMMUNICATION

(75) Inventors: Vinh Van Phan, Oulu (FI); Kari Veikko Horneman, Oulu (FI); Ling Yu, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 616 days.

(21) Appl. No.: 13/981,622

(22) PCT Filed: Jan. 27, 2011

(86) PCT No.: PCT/EP2011/051131
§ 371 (c)(1),
(2), (4) Date: Aug. 30, 2013

(87) PCT Pub. No.: WO2012/100828
PCT Pub. Date: Aug. 2, 2012

(65) Prior Publication Data
US 2013/0337813 A1    Dec. 19, 2013

(51) Int. Cl.
*H04Q 7/20* (2006.01)
*H04W 36/08* (2009.01)
*H04W 84/00* (2009.01)
*H04W 36/14* (2009.01)
*H04W 84/04* (2009.01)

(52) U.S. Cl.
CPC ......... *H04W 36/08* (2013.01); *H04W 84/005* (2013.01); *H04W 36/14* (2013.01); *H04W 84/047* (2013.01)

(58) Field of Classification Search
CPC ....................................................... H04Q 7/20
USPC ................................................. 455/436–442
See application file for complete search history.

(56) References Cited

U.S. PATENT DOCUMENTS

| | | | |
|---|---|---|---|
| 2003/0235165 A1* | 12/2003 | Wang | H04W 36/12 370/331 |
| 2008/0125125 A1 | 5/2008 | Choi et al. | |
| 2010/0279684 A1* | 11/2010 | Salkintzis | H04W 48/20 455/434 |
| 2011/0044253 A1* | 2/2011 | Zisimopoulos | H04W 48/16 370/328 |

FOREIGN PATENT DOCUMENTS

| | | |
|---|---|---|
| CN | 1477887 A | 2/2004 |
| CN | 101754411 A | 6/2010 |
| CN | 101808352 A | 8/2010 |
| EP | 2 053 880 A1 | 4/2009 |

* cited by examiner

*Primary Examiner* — Charles Appiah
*Assistant Examiner* — Randy Peaches
(74) *Attorney, Agent, or Firm* — Harrington & Smith

(57) ABSTRACT

Apparatus and method for controlling the establishment of a network connection to a mobile relay; communicating with the moving relay connected to a donor network; controlling the activation, reactivation and setup of the connection<a moving relay with donor cellular networks, the networks being controlled by more than one operator; and creating or reactivating and keeping update of the context of the mobile relay context when the mobile relay establishes a connection with a donor cellular network.

13 Claims, 2 Drawing Sheets ized mobile communication system standardized within 3GPP (3rd Generation Partnership Project) has introduced a relayed extension to cellular network infrastructure. Relaying links

APPARATUS AND METHOD FOR COMMUNICATION

FIELD

The exemplary and non-limiting embodiments of the invention relate generally to wireless communication networks. Embodiments of the invention relate especially to an apparatus and a method in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

With the ever increasing demand for increasing data rates and higher quality services in the world of mobile communications comes ever increasing demand for better performance of cellular network infrastructures. People use their mobile equipment with support for high data rate services while they are at work, at home, and/or while traveling on a mass transportation vehicle, e.g. bus, train, and ship. Such a mass transportation vehicle may travel at a speed of up to 100 m/s, and a huge number of communicating mobile devices in the vehicle traveling at the same speed sets high demands for network operators, because the users wish to preserve their high data rate connections regardless of the speed of the vehicle.

Long-term evolution (LTE) of the 3rd generation mobile communication system standardized within 3GPP (3rd Generation Partnership Project) has introduced a relayed extension to cellular network infrastructure. Relaying links between user terminals and conventional base stations through mobile relays or relaying base stations improves capacity, coverage, and data rates. The mobile relays may be installed in buses, trains, cruisers and other mass transportation vehicles.

One problem associated with supporting mobile relay systems is the need of providing and ensuring sufficiently high data rates for the mobile wireless backhaul connections, also referred to as relay links, between a mobile relay system and donor cellular systems which are changing in time due to the mobility of the mobile relay system. The fair sharing of limited radio resources of the donor cellular systems with other regular mobile users needs to be solved as well.

In addition, there is the need for the mobile relay system to support all mobile users aboard, regardless of their associated home operators, also referred to as the multi-operator problem.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor; and at least one memory including computer program code, the at least one memory and the computer program code configured to, with the at least one processor, cause the apparatus at least to perform: control the establishment of a network connection between the mobile relay and the apparatus; coordinate or control the activation, reactivation and setup of the connection of a moving relay with donor cellular networks, the networks being controlled by more than one operator; and create or reactivate and keep update of the context of the mobile relay context when the mobile relay has a connection established with a donor cellular network.

According to another aspect of the present invention, there is provided a method comprising: controlling the establishment of a network connection to a mobile relay; communicating with the moving relay connected to a donor network; coordinating or controlling the activation, reactivation and setup of the connection of a moving relay with donor cellular networks, the networks being controlled by more than one operator; and creating or reactivating and keeping update of the context of the mobile relay context when the mobile relay has a connection established with a donor cellular network.

According to an aspect of the present invention, there is provided an apparatus, comprising: at least one processor; and at least one memory including computer program code, the at least one memory and the computer program code configured to, with the at least one processor, cause the apparatus at least to perform: communicate with the Access Network Discovery and Selection Function of a cellular network for controlling the activation, reactivation and setup of the connection of the apparatus with donor cellular networks, the networks being controlled by more than one operator; and receive apparatus context from the Access Network Discovery and Selection Function during the establishment of a connection with a donor cellular network.

According to another aspect of the invention, there is provided a method, comprising: communicating with the Access Network Discovery and Selection Function of a cellular network for controlling the activation, reactivation and setup of the connection with donor cellular networks, the networks being controlled by more than one operator and receiving context from the Access Network Discovery and Selection Function during the establishment of a connection with a donor cellular network.

LIST OF DRAWINGS

Embodiments of the present invention are described below, by way of example only, with reference to the accompanying drawings, in which FIG. 1 illustrates an example of a communication environment to which embodiments of the invention may be applied;

DESCRIPTION OF SOME EMBODIMENTS

Embodiments are applicable to any base station, user equipment, server, corresponding component, and/or to any communication system or any combination of different communication systems that support required functionality. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of a system architecture whereto the embodiments may be applied, an architecture based on Evolved UMTS terrestrial radio access (E-UTRA, UMTS=Universal Mobile Telecommunications System) without restricting the embodiment to such an architecture, however.

Figure 1:
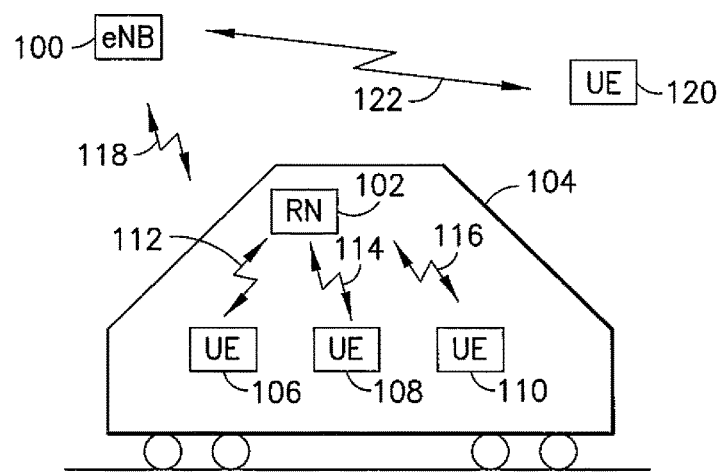

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN), worldwide interoperability for microwave access (WiMAX), Bluetooth®, personal communications services (PCS) and systems using ultra-wideband (UWB) technology. FIG. 1 illustrates an example of a communication environment between user equipment and a telecommunication system. In the illustrated scenario, a mobile relay or a relay base station is installed in a mobile vehicle and configured to relay cellular communication links between fixed cellular network infrastructure and user equipment. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

The example of FIG. 1 shows a base station or eNode B 100 serving one or more macro cells and a mobile relay 102 installed in a mobile vehicle 104. The mobile relay 102 is configured to provide network access to user equipment 106, 108, 110 in the moving vehicle. Thus, it serves a moving cell. The user equipment are connected 112, 114, 116 to the mobile relay 102. The mobile relay 102 is connected 118 to the macro eNodeB. Naturally, the eNodeB 100 may also serve other user equipment 120 having direct connections 122 with the eNodeB.

The user equipment refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

The mobile relay 102 may have the full functionality of e.g. LTE-A eNode B towards the user equipment 106, 108, 110 but it is attached to the network side using a mobile wireless backhaul.

Figure 2:
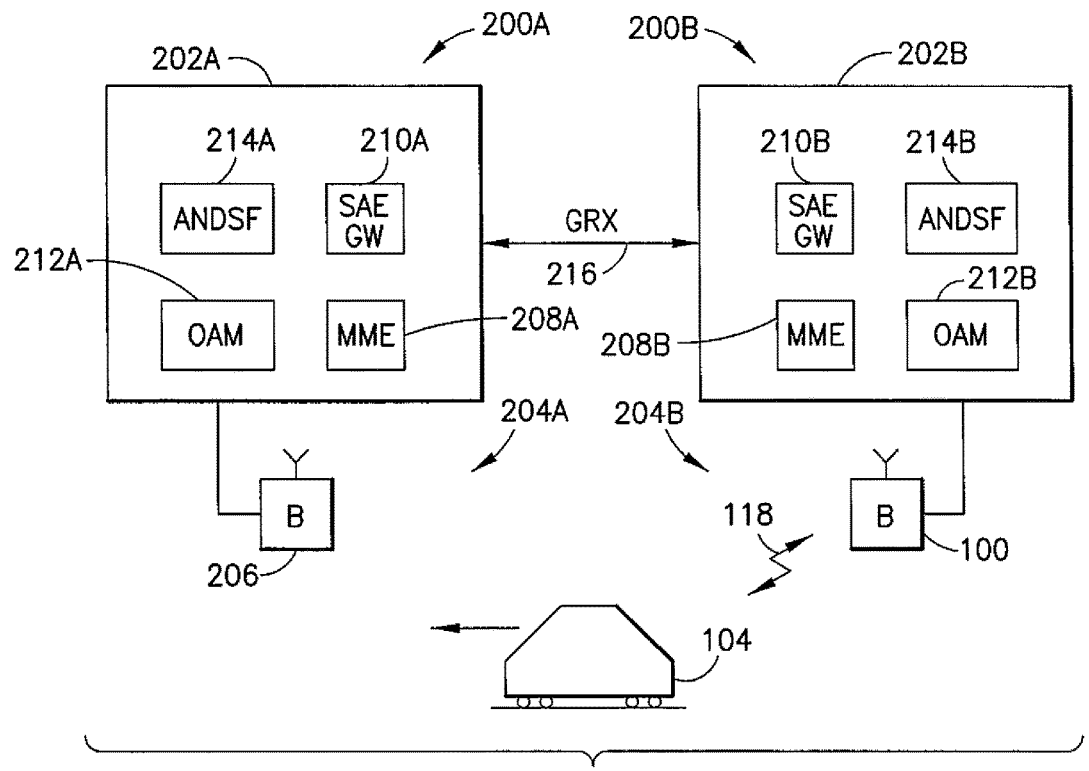
FIG. 2 shows a simplified block diagram illustrating an exemplary system architecture.

FIG. 2 illustrates an example of a communication environment between a relay node 102 and cellular networks. FIG. 2 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

The example of FIG. 2 comprises two cellular networks 200A, 200B of two operators. Each network comprises a core network 202A, 202B and a radio access network 204A, 204B. In this simplified example the radio access networks are illustrated with one eNodeB 100, 206.

The core networks of the operators comprise following elements: an MME (Mobility Management Entity) 208A, 208B, an SAE GW (SAE Gateway) 210A, 210B and an OAM (Operations, Administration and Management system) 212A, 212B. The core network further comprises an ANDSF (Access Network Discovery and Selection Function) 214A, 214B. It should be appreciated that the communication system may also comprise other core network elements besides the illustrated. Base stations that may also be called eNodeBs (Enhanced node Bs) 100, 206 of the cellular system may host the functions for Radio Resource Management: Radio Bearer Control, Radio Admission Control, Connection Mobility Control, Dynamic Resource Allocation (scheduling). The MME 208A, 208B is responsible for distributing paging messages to the eNodeBs 100, 206. The eNodeBs are connected to the SAE GW with an S1_U interface and to MME with an S1_MME interface. The SAE GW 210A, 210B is an entity configured to act as a gateway between the network and other parts of communication network such as the Internet for example. The SAE GW may be a combination of two gateways, a serving gateway (S-GW) and a packet data network gateway (P-GW). The ANDSF 214A, 214B is a network-protocol functionality which is configured to assist user equipment of the network to make mobility decisions between 3GPP and non-3GPP access technologies on the basis of the network operator policy. For example, the ANDSF enables user equipment supporting multiple access technologies to select most suitable access network in the area where different access technologies such WLAN or WiMAX are available.

Each cellular network 200A, 200B of an operator is operated as a closed system from radio network management point of view. The networks of different operators are connected with each other using a Global Roaming Interface (GRX) 216. The networks 200A, 200B may be roaming partners allowing visiting user equipment of another network to get service. Visiting user equipment is authenticated from the home network of the user equipment.

FIG. 2 only illustrates a simplified example. In practice, the network may include more base stations and more cells may be formed by the base stations. The networks of two or more operators may overlap, the sizes and form of the cells may vary from what is depicted in FIG. 1, etc.

The embodiments are not restricted to the network given above as an example, but a person skilled in the art may apply the solution to other communication networks provided with the necessary properties. For example, the connections between different network elements may be realized with Internet Protocol (IP) connections.

In the example of FIG. 2, a vehicle comprising a mobile relay 102 is in the serving area of the radio access network 202B of the cellular network 200B. The mobile relay 102 is in connection 118 with the eNodeB 100.

In an embodiment, the networks 200A, 200B comprise a network element configured to act as a smart coordinating and configuring agent of the involved cellular systems for supporting efficient mobile relay deployment and operation. The network element may be configured to support and control the operation of a mobile relay and the donor networks the mobile relay is connected to, where the networks may be controlled by different operators.

For example, the network element may control the activation, reactivation and setup of the connection of a moving relay with donor cellular networks, the networks being controlled by more than one operator. The network element may coordinate the involved home-visited donor cellular networks and provide assistance for an optimal configuration of mobile relay.

In an embodiment, the network element is the ANDSF 214A, 214B. In the example of FIG. 2, the network element may be the ANDSF 214B.

The network element 214B may be configured to be responsible for creation, reactivation and updating of mobile relay context upon reactivation and setup of the mobile relay into a donor cellular network. The network element may also control the establishment of a possible network connection between the mobile relay and the network element. The context of a mobile relay may include system-structure information (as deployed with single relay node or multiple relay nodes, single cell or multiple cells, local connectivity and cooperative capabilities thereof), identities, capabilities and supporting multi-operator information. In addition, the context may comprise information on specific information of transportation vehicle such as type, physical dimensions, speed range, passenger capacity and class distribution, operator company, etc. In case the mobile relay is located in a public transportation such as bus, train or ship, having predefined travelling routes, scheduled time tables, transit stops, certain passenger information, under control of a third-party system, the network element 214B may be configured to contact the third-party system to fetch such information of the mobile relay for predictive mapping and controlling purposes. In an embodiment, the network element 214B may be configured to contact other potential donor cellular systems which may serve the mobile relay along the road as derived from the known mobile relay contexts in addition to the current serving one at this stage for e.g. a proper beforehand-agreed network configurations and commitment levels in supporting and serving mobile relay and local cell(s) thereof. This includes, for examples, specific radio network identities, spectrum resources, system parameters and policies, basic radio-interface configurations, etc. In the example of FIG. 2, the network element 214B may be configured to contact the network 200A. The connection may be realised using the interface GRX 216. The network element 214B may communicate with the respective element 214A of the network 200A of the other operator.

In an embodiment, the network element 214B may coordinate the involved home-visited cellular networks and provide guidance for the mobile relay in inter-operator inter-system handover. For example, the network element such as the ANDSF may configure and update the mobile relay with potential targeted donor candidates (Automatic Neighbour Relation—ANR issues) in advance based on mobile relay context awareness, negotiation or status update indication from involved parties. The network element 214B may also trigger and initiate an inter-operator inter-system handover for the mobile relay due to e.g. some load-balancing or mobility reasons either by itself or upon a request from the current serving donor system 200B.

In an embodiment, the network element 214B assists the mobile relay 102 in communicating necessary system information and pre-allocation of the target donor system to the mobile relay.

The network element 214B may be configured to determine and set handover thresholds and timing parameters such as handover timers or delay constraints to the source- and target donor systems and the mobile relay. It should be noted that depending on e.g. physical dimensions and travelling speed of transportation vehicle it may take up to tens of seconds for the vehicle such as a train a train to pass through the cell border between a source- and a targeted cell.

In an embodiment, the network element 214B is configured to coordinate the involved home-visited cellular networks and provide assistance for the location update of user equipment connected to a mobile relay.

In large vehicles the number of passengers may be large. For example hundreds of passengers, local or foreigner, may board an inter-city train and they all are potential mobile users, subscribed to different cellular operators. This causes a need for mass location registration and update from time to time to the idle and active user equipment aboard as the train may be passing many tracking areas of networks of different operators and may change serving donor system as a result of inter-operator inter-system handovers. It is desirable that individual user equipment abroad would need to perform a location-registration-and-update procedure only once upon boarding the train, and, as long as the user equipment is staying aboard, the mobile relay system deployed on the train and the current serving donor system(s) should be able to take care of location update for the user equipment.

In an embodiment, the network element 214B is configured to obtain, update and store necessary contexts of idle and active user equipment aboard the vehicle the relay is located and assist relevant cellular systems in keeping track of mobile location of user equipment aboard during the trip.

When individual user equipment visiting outside the home network first select the mobile relay system to camp on or connect to, for example the relay 102, the MME 208B of the current serving donor system 200B may forward request of the user equipment to the network element 214B, instead of or in addition to regular home-visitor registration servers.

In the former option, the network element 214B may examine the request and user equipment information thereof and then determine and contact relevant home-visitor network of the requesting user equipment to perform necessary registration and location update for the user equipment. In the latter option, the home-visitor network may request and update the network element 214B with necessary contexts of the user equipment.

During the journey, as the network element 214B is keeping track of mobile relay connection mobility, the network element 214B may determine and initiate mass location update for user equipment aboard with their corresponding home-visitor networks. This means that if many user equipment aboard are subscribers of the same operator a single location update request or indication from the network element 214B towards that operator may consist multiple instances of relevant user equipment.

The network element 214B may remove contexts of individual user equipment getting off the train during the journey or at the end of journey or final destination, triggered by indication from the mobile relay and current serving donor system in case a hand over of active user equipment is performed, or from the cellular system an idle user equipment getting off the train selects, or by the network element 214B itself at each stopping stations based on awareness of mobile relay and user equipment contexts.

Figure 3A:
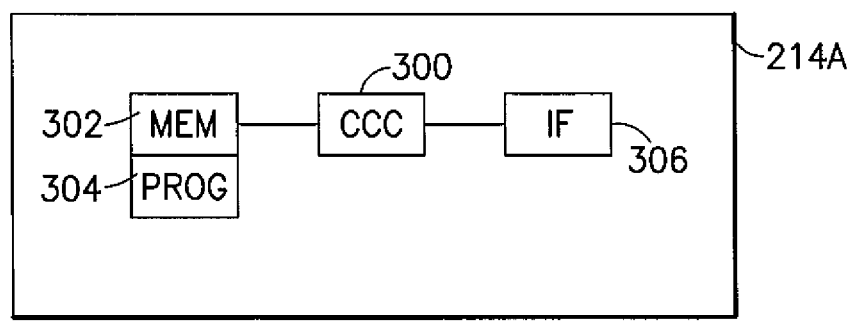
FIGS. 3A and 3B illustrate examples of apparatuses according to embodiments of the invention.

FIG. 3A illustrates a simplified example of an apparatus 214A. In some embodiments, the apparatus may be an ANDSF of a cellular network. In an embodiment, it is a separate network element.

It should be understood that the apparatus is depicted herein as an example illustrating some embodiments. It is apparent to a person skilled in the art that the apparatus may also comprise other functions and/or structures. Although the apparatus has been depicted as one entity, different modules and memory may be implemented in one or more physical or logical entities.

The apparatus of the example includes a communication control circuitry 300 configured to control at least part of the operation of the apparatus.

The apparatus may comprise a memory 302 for storing data. Furthermore the memory may store software 304 executable by the control circuitry 300. The memory may be integrated in the control circuitry. The software may comprise a computer program comprising program code means adapted to perform any of steps described above in relation to the network element 214B.

Figure 3B:
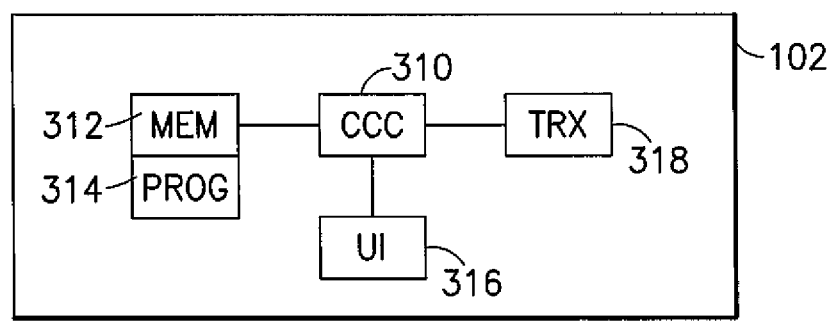

The apparatus may further comprise interface circuitry 306 configured to connect the apparatus to other devices of communication network, for example to core network. The interface may provide a wired or wireless connection to the communication network. The apparatus may be in connection with a mobile relay, core network elements and with respective apparatuses of networks of other operators, such as the network element 214A of the network 200A. FIG. 3B illustrates a simplified example of a mobile relay 102. It should be understood that the apparatus is depicted herein as an example illustrating some embodiments. It is apparent to a person skilled in the art that the mobile relay node may also comprise other functions and/or structures. Although the mobile relay has been depicted as one entity, different modules and memory may be implemented in one or more physical or logical entities.

The mobile relay may be implemented in part or in whole as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The electronic digital computer may also have an operating system, which may provide system services to a computer program written with the program instructions. The mobile relay of the example includes a communication control circuitry 310 configured to control at least part of the operation of the mobile relay node.

The mobile relay further comprises a transceiver 318 configured to communicate with other devices, such as user equipment or eNodeB's. The transceiver is operationally connected to the control circuitry 310. It may be connected to an antenna arrangement (not shown).

As one skilled in the art is aware, the transceiver may be realized as a separate transmitter and receiver.

The apparatus may further comprise a memory 312 for storing data. Furthermore the memory may store software 314 executable by the control circuitry 310. The memory may be integrated in the control circuitry. The software may comprise a computer program comprising program code means adapted to perform any of steps described above in relation to the mobile relay 102.

In an embodiment, the apparatus may further comprise user interface 316 with which the apparatus may be configured by hand if need arises. The user interface may comprise a display and a keypad or keyboard, for example.

The steps, messages and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design.

The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, an electrical carrier signal, a telecommunications signal, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus operating as an Access Network Discovery and Selection Function of a donor cellular network to which a mobile relay is connected, the apparatus comprising:
    at least one processor; and
    at least one memory including computer program code, the at least one memory and the computer program code configured to, with the at least one processor, cause the apparatus at least to perform:
        control establishment of a network connection between the mobile relay and the apparatus;

coordinate or control activation, reactivation and setup of the connection of the mobile relay with donor cellular networks, the networks being controlled by more than one operator;

create or reactivate and keep update of a context of the mobile relay when the mobile relay has a connection established that moves between the donor cellular networks controlled by the different operators, the context comprising system information, identities and capabilities of the mobile relay;

coordinate, based on the context of the mobile relay, the inter-operator handover of the mobile relay by communicating information of possible donor network candidates, handover triggers and other configuration and control information to the mobile relay; and obtain, update and store necessary contexts of idle and active user equipments connected to the mobile relay and assist the home and visiting cellular systems of the respective user equipments in keeping track of the mobile locations of said respective user equipments while the respective user equipments are connected to the mobile relay as the connection of the mobile relay moves between the donor cellular networks controlled by the different operators.

2. The apparatus of claim 1, the apparatus being configured to communicate with donor cellular systems which may serve the mobile relay as a handover candidate.

3. The apparatus of claim 1, the apparatus being configured to determine and set handover thresholds and timing parameters including at least handover timers or delay constraints to a handover target donor cellular network and the mobile relay.

4. The apparatus of claim 1, the apparatus being configured to receive from a Mobility Management Entity of the donor cellular network to which the mobile relay is connected, data of the respective user equipments that are connected to the mobile relay.

5. The apparatus of claim 1, the apparatus being configured to send location update messages of the respective user equipments that are connected to the mobile relay on behalf of the respective user equipments.

6. The apparatus of claim 1, wherein the apparatus is configured to communicate with the Access Network Discovery and Selection Functions of the donor cellular networks of other operators.

7. A method for operating an Access Network Discovery and Selection Function of a donor cellular network to which a mobile relay is connected, comprising:

controlling establishment of a network connection to the mobile relay;

coordinating or controlling activation, reactivation and setup of the connection of the mobile relay with donor cellular networks, the networks being controlled by more than one operator;

creating or reactivating and keeping update of a context of the mobile relay when the mobile relay has a connection established that moves between the donor cellular networks controlled by the different operators, the context comprising system information, identities and capabilities of the mobile relay;

coordinating, based on the context of the mobile relay, the inter-operator handover of the mobile relay by communicating information of possible donor network candidates, handover triggers and other configuration and control information to the mobile relay; and obtaining, updating and storing necessary contexts of idle and active user equipments connected to the mobile relay and assisting home and visiting cellular systems of the respective user equipments in keeping track of the mobile locations of the respective user equipments while the respective user equipments are connected to the mobile relay as the connection of the mobile relay moves between the donor cellular networks controlled by the different operators.

8. The method of claim 7, further comprising: communicating with donor cellular systems which may serve the mobile relay as a handover candidate.

9. The method of claim 7, further comprising: determining and setting handover thresholds and timing parameters including at least handover timers or delay constraints to a handover target donor cellular network and the mobile relay.

10. The method of claim 7, further comprising: receiving from a Mobility Management Entity of the donor cellular network to which the mobile relay is connected, data of the respective user equipments that are connected to the mobile relay.

11. The method of claim 7, further comprising: sending location update messages of the respective user equipments that are connected to the mobile relay on behalf of the respective user equipments.

12. The method of claim 7, further comprising:

communicating with the Access Network Discovery and Selection Functions of the donor cellular networks of other operators.

13. A non-transitory computer readable memory on which is stored program which, when executed by a computer coupled thereto, cause a host apparatus operating an Access Network Discovery and Selection Function of a donor cellular network to which a mobile relay is connected to at least:

control establishment of a network connection to the mobile relay;

coordinate and/or control activation, reactivation and setup of the connection of the mobile relay with donor cellular networks, the networks being controlled by more than one operator; and create and/or reactivate and keep update of a context of the mobile relay when the mobile relay has a connection established that moves between the donor cellular networks controlled by the different operators, the context comprising system information, identities and capabilities of the mobile relay;

coordinating, based on the context of the mobile relay, the inter-operator handover of the mobile relay by communicating information of possible donor network candidates, handover triggers and other configuration and control information to the mobile relay; and obtain, update and store contexts of idle and active user equipments connected to the mobile relay and assist home and visiting cellular systems of the respective user equipments in keeping track of mobile locations of the respective user equipments while the respective user equipments are connected to the mobile relay as the connection of the mobile relay moves between the donor cellular networks controlled by the different operators.

* * * * *